United States Patent [19]

Satoh et al.

[11] 4,213,023

[45] Jul. 15, 1980

[54] HIGH FREQUENCY ENERGY APPARATUS WITH AUTOMATIC HEATING CYCLE CONTROL

[75] Inventors: Kenji Satoh; Hajime Tachikawa; Mitsuru Watanabe, all of Yokohama, Japan

[73] Assignee: Hitachi Heating Appliances Co., Ltd., Japan

[21] Appl. No.: 839,257

[22] Filed: Oct. 4, 1977

[30] Foreign Application Priority Data

Oct. 6, 1976 [JP] Japan .................... 51/120040
Oct. 20, 1976 [JP] Japan .................... 51/125706

[51] Int. Cl.² .................... H05B 9/06; G05D 23/20
[52] U.S. Cl. .................... 219/10.55 B; 236/15 BB; 307/358
[58] Field of Search .......... 219/10.55 B; 236/15 BB, 236/15 BF, 78 B; 432/32; 34/4; 307/358

[56] References Cited

U.S. PATENT DOCUMENTS

| | | | |
|---|---|---|---|
| 3,185,809 | 5/1965 | Bohm et al. | 219/10.55 B |
| 3,281,568 | 10/1966 | Haagensen | 219/413 X |
| 3,566,133 | 2/1971 | Dorman, Jr. et al. | 307/358 X |
| 3,804,979 | 4/1974 | Knowles | 307/358 X |
| 4,009,359 | 2/1977 | Tallmadge et al. | 219/10.55 B |
| 4,063,182 | 12/1977 | Besson | 307/358 X |
| 4,109,129 | 8/1978 | Satoh et al. | 219/10.55 B |
| 4,115,678 | 9/1978 | Tachikawa et al. | 219/10.55 B |

*Primary Examiner*—Bruce A. Reynolds
*Assistant Examiner*—Keith E. George
*Attorney, Agent, or Firm*—Craig & Antonelli

[57] ABSTRACT

A high frequency energy apparatus is provided in which high frequency energy is supplied into a heating chamber containing an object to be heated for heating the same. A temperature sensor unit senses either the temperature of air within the heating chamber or the temperature of air flowing out of the heating chamber and a memory unit memorizes a sensed air temperature. When a difference between the air temperature sensed and the memorized temperature reaches a preset value, the amount of supply of the high frequency energy is varied. The preset value is varied with the heating time for heating the object more properly.

25 Claims, 15 Drawing Figures

HIGH FREQUENCY ENERGY APPARATUS WITH AUTOMATIC HEATING CYCLE CONTROL

LIST OF PRIOR ART REFERENCES (37 CFR 1.56 (a))

The following references are cited to show the state of the art:

U.S. Pat. No. 3,185,809 Bohm et al May 25, 1965 219-10.55.

U.S. Pat. No. 3,281,568 Haagensen Oct. 25, 1966 219-10.55.

This invention relates to high frequency energy apparatus and more particularly to an improvement of a control arrangement which is provided for use with high frequency energy apparatus such as microwave ovens and which is adapted to control heating of an object to be heated automatically and properly.

Conventionally, in a high frequency energy apparatus in which high frequency energy is supplied into a heating chamber containing an object to be heated for heating the same, the heating time for the object was adjusted by a user through the use of a timer. However, since the heating time necessary for heating the object varies depending on the nature of the object such as its mass, quality (for example, hydration percentage and type of composition substance) and shape, the location of the object within the heating chamber and the amount of high frequency energy, highgrade skill was required for setting the heating time properly. Accordingly, overheated or underdone conditions of the object were often caused by an improper setting of the timer.

A countermeasure for eliminating this defect was proposed wherein the temperature of the object to be heated is sensed indirectly, for automatically controlling the heating time, by sensing the temperature of air flowing out of the heating chamber, hereinafter referred to simply as outlet air temperature, and comparing a sensed temperature with a fixed reference value.

With this countermeasure, however, when the continuous operation of the high frequency energy apparatus is repeated cyclically, the outlet air temperature rises more and more at the commencement of heating operation for every cycle and hence the outlet air temperature at the termination of the heating cycle rises gradually. As a result, this proposed measure wherein the outlet air temperature is compared with the fixed reference value to determine the time at which the heating has finished suffers a great error in heating control. Also, even when the apparatus is not operated continuously, it is difficult to maintain a proper heating for objects of different masses because temperature rise characteristic of the outlet air varies depending on the mass of an object to be heated.

This measure sensing only the outlet air temperature as explained above is also defective in that the outlet air temperature varies with the ambient temperature in which the high frequency energy apparatus is placed, this variation giving rise to an erroneous controlling. To eliminate the last mentioned defect, another approach has been made wherein the temperature of air flowing into the heating chamber, hereinafer referred to simply as inlet air temperature, in addition to the outlet air temperature, is sensed at an air inlet of the heating chamber, difference in temperature between the inlet air and the outlet air is measured to determine a temperature rise of the outlet air during the time of heating, and the outlet air temperature rise is compared with a fixed reference value to indirectly sense a temperature of an object to be heated, thereby automatically controlling the heating time.

The latter approach is less affected by variations in the ambient temperature than the former measure and it succeeded in improving sensing accuracy of the temperature of the object to be heated. The latter approach, however, encounters an erroneous controlling such as in the former measure when the high frequency energy apparatus is operated continuously cyclically and when the mass of an object to be heated varies. Moreover, since locations of an inlet temperature sensor and an outlet temperature sensor are spaced apart, the inlet air temperature is not always equal to the outlet air temperature and this initial difference in temperature leads to an error in controlling.

An object of this invention is to provide a high frequency energy apparatus capable of automatically and properly controlling the heating time for the object to be heated by accurately sensing the temperature rise of the outlet air during heating.

To accomplish the above object, according to this invention, an outlet air temperature immediately before or immediately after the commencement of heating operation is memorized in a memory unit, the memorized initial value of outlet air temperature is compared with an outlet air temperature during the successive heating operation to sense a temperature rise of the outlet air during that successive heating operation, and the supply of high frequency energy is controlled when the temperature rise of the outlet air reaches a predetermined value.

Preferably, the preset value for the temperature rise of the outlet air for controlling the supply of high frequency energy is increased gradually as the heating time proceeds.

Other objects, features and effects of the invention will become apparent from the following detailed description taken in conjunction with the accompanying drawings in which.

Prior to describing the invention in detail, heating control arrangements of the prior art high frequency energy apparatus as mentioned hereinbefore will be described again for better understanding of the invention.

Figure 1:
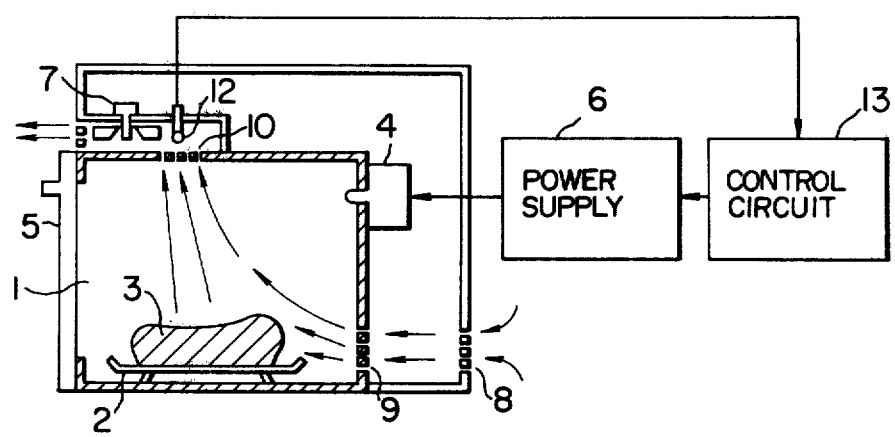
FIG. 1 is a schematic diagram of one example of prior art high frequency energy apparatus with a heating control arrangement.

FIG. 1 shows one example of prior art high frequency energy apparatus with a heating control arrangement. This prior art heating control is based on the theory that as an object 3 to be heated which is placed on a dish 2 within a heating chamber 1 undergoes heating by receiving high frequency energy supplied from a high frequency oscillator tube 4, the temperature of air within the heating chamber 1 rises so that the outlet air temperature also rises.

In FIG. 1, the high frequency oscillator tube 4 is driven by a power supply 6 to start oscillating and its high frequency output energy is admitted to the heating chamber 1 to heat the object 3. During heating, a ventilating fan 7 for the heating chamber is operated so that external air is drawn in through an inlet 8 of a high frequency energy apparatus, admitted into the heating chamber 1 through an inlet 9 of the heating chamber, passed arround the object 3, drawn out of the heating chamber 1 through an outlet 10 of the heating chamber, and finally drawn out of the high frequency energy apparatus through the ventilating fan 7. During this circulation, the temperature of the air being drawn out of the heating chamber 1 is sensed by an outlet temperature sensor 12 and a sensed signal is supplied to a control unit 13. When an outlet temperature reaches a preset value, the control unit 13 turns off the power supply 6 to thereby cause the high frequency oscillator tube 4 to stop oscillating. A door 5 of the heating chamber is provided for entry and removal of the object 3.

With this construction, as the temperature of the object rises, the outlet temperature also rises and hence a predetermined correlation can be obtained between these temperature rises. When based on such a correlation between the outlet temperature and the object temperature, sensing the outlet temperature permits an automatic heating control.

This prior art heating control, however, has the following disadvantages:

(1) In the case the continuous, cyclic operation of the high frequency energy apparatus is repeated cyclically, a large controlling error occurs.

Figure 2:
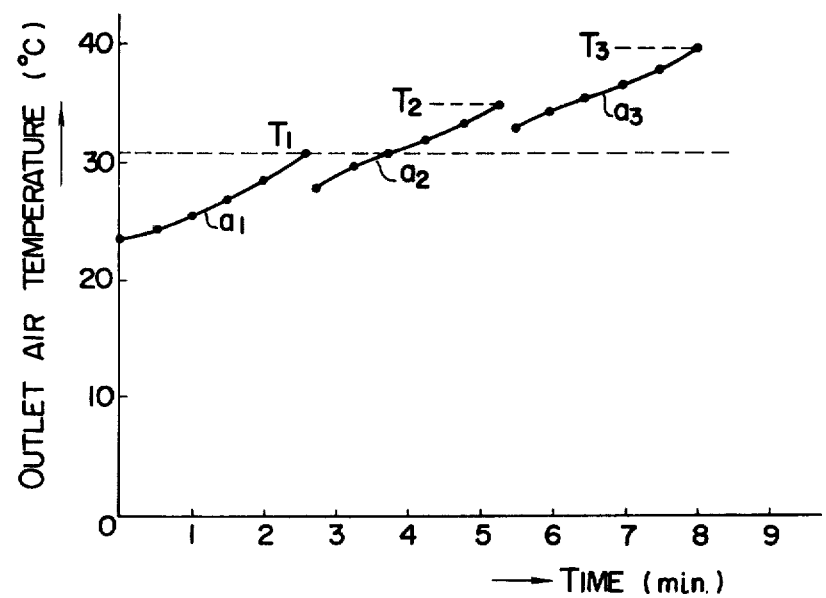
FIG. 2 is a graph useful to explain errors in heating control with the high frequency energy apparatus shown in FIG. 1.

With a 600 W high frequency energy output microwave oven, 200 cc water (an object to be heated) was subjected three times to a continuous heating from its initial temperature of 20° C. to boiling temperature (the heating time was 2 minutes and 35 seconds for each heating cycle; water heated during the previous heating cycle was exchanged with virgin water within 10 seconds and the subsequent heating continued). Temperature rise characteristics as shown in FIG. 2 were obtained for respective outlet temperature curves $a_1$, $a_2$ and $a_3$. As will be seen from FIG. 2, the outlet temperature at the commencement of heating increases gradually as the continuous heating is repeated. This is because the dish 2 and the wall of the heating chamber have increased in temperature during the previous heating and heated air generated from the object 3 fills the heating chamber 1. In this manner, for the cyclic continuous operation of the apparatus, the outlet temperature at the commencement of heating rises so that the outlet temperature at the termination of every cycle (in the above experiment, the time point of termination of the heating was defined as the time point when water began to boil, and the period from the commence to termination of heating took 2 minutes and 35 seconds) also rises gradually as shown by $T_1$, $T_2$, and $T_3$ in FIG. 2. Accordingly, if the heating control is preset such that the heating is stopped when the outlet temperature reaches a predetermined value, for example $T_1$, the heating for the second cycle becomes immature. That is to say, the supply of high frequency energy is stopped before a desired heated state is obtained. Moreover, in advance of the third cycle, the heating is stopped with the result that the third cycle is prevented.

(2) When the mass of the object 3 is different, a large controlling error results.

Figure 3:
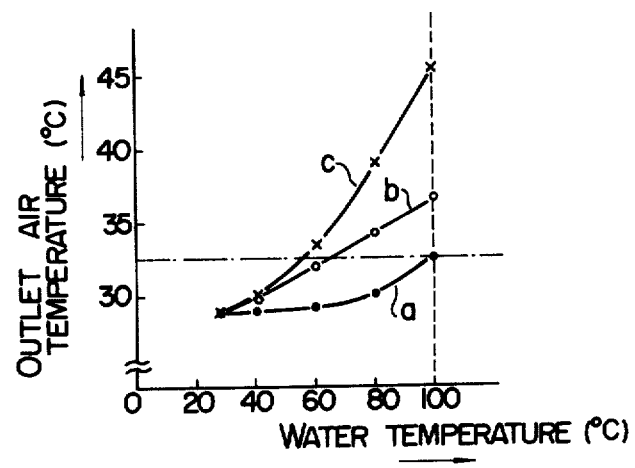
FIG. 3 is a graph similar to FIG. 2.

FIG. 3 shows outlet temperature rise characteristics in relation to water temperature when water was employed as an object 3. With parameters of the mass of water, curves a, b and c correspond to 100 cc, 300 cc and 1000 cc water, respectively. A preset value of the outlet temperature was so fixed that the heating was terminated at a time at which 100 cc water was heated up to 100° C. Because of dependency of the gradient of outlet temperature rise characteristics in relation to water temperature upon the mass of water, the heating sufficient for 100 cc water to reach 100° C. was insufficient for 300 cc water and 1000 cc water, causing them to reach 68° C. and 56° C., respectively. Thus, the finished temperature greatly varies with the mass of water and a proper heating is prevented.

When the mass of the objects to be heated such as water is different, the larger the mass, the larger the outlet air temperature rise is until the larger mass reaches the same temperature, as shown in FIG. 3. This is because, firstly, the larger mass results in a larger surface area and larger holding heat capacity. Namely, the larger the mass is and therefore the larger the surface area and heat capacity, the more actively the heat transfer is effected from the mass to the surrounding atmosphere. Secondly, since the heating of a very large mass requires a long heating time, the outlet air temperature rise component is larger due to the heat produced by such things, other than the mass, as for example the illumination lamp in the heating chamber, walls of the heating chamber and a dish in the heating chamber which are heated by the high-frequency energy, and a high-frequency oscillation tube, etc.

Figure 4:
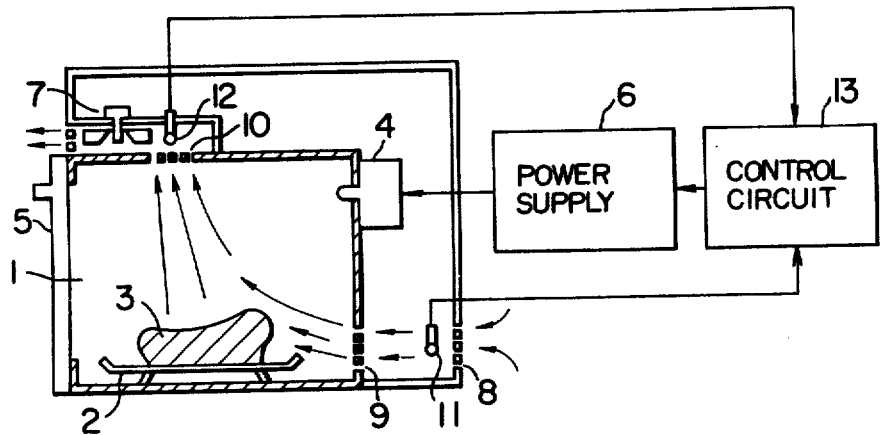
FIG. 4 is a schematic diagram of another example of prior art high frequency energy apparatus with a heating control arrangement.

Turning to FIG. 4, another example of prior art high frequency energy apparatus with a heating control arrangement will be described. In the figure, the same component elements as those in FIG. 1 are designated by the same reference numerals. This heating control arrangement is different from the arrangement of FIG. 1 in that the temperature of external air which has been drawn into the high frequency energy apparatus through the inlet 8 and which is now ready for being drawn into the heating chamber 1 is sensed by a temperature sensor 11 and a sensed signal is also supplied to the control unit 13. Difference in sensed temperatures between the temperature sensors 11 and 12 is determined as an outlet temperature rise during heating. When the outlet temperature rise reaches a preset value, the control unit 13 turns off the power supply 6 to thereby cause the high frequency oscillator tube 4 to stop oscillating.

Figure 5:
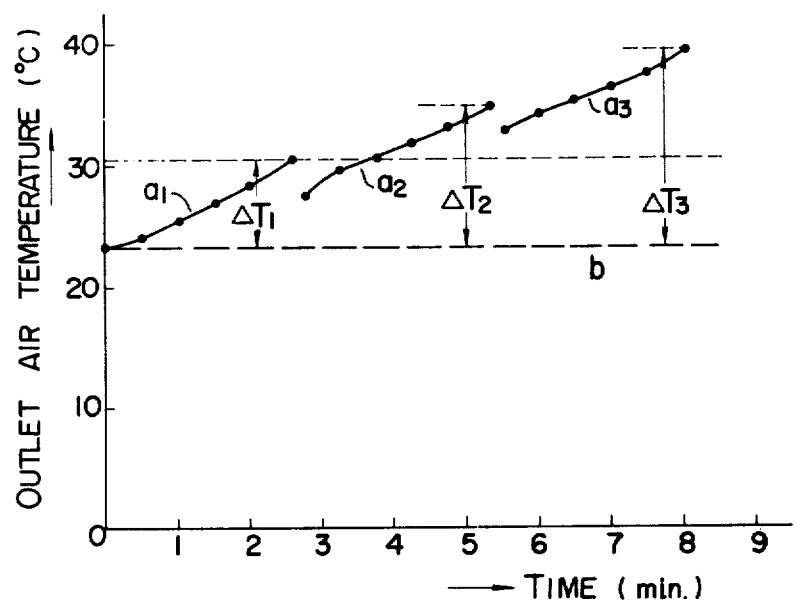
FIG. 5 is a graph useful to explain errors in heating control with the high frequency energy apparatus shown in FIG. 4.

This second prior art heating control arrangement, wherein difference between the inlet temperature to the heating chamber and the outlet temperature therefrom is sensed to determine the outlet temperature rise during heating operation and then the heating is controlled by that outlet temperature rise, is less affected by variations in the ambient temperature than the first arrangement wherein the value of outlet temperature is used to control the heating operation by sensing only the outlet temperature and hence improves accuracy of sensing the temperature of the object 3 to be heated. The second arrangement, however, cannot be free from disadvantages as explained with reference to FIGS. 2 and 3. A similar disadvantage to FIG. 2 will be explained by referring to FIG. 5. FIG. 5 shows results of an experiment executed under the same conditions as the experiment of FIG. 2, where outlet temperature curves $a_1$, $a_2$ and $a_3$ are for first, second and third heating cycles, respectively, as in FIG. 2. These curves $a_1$, $a_2$ and $a_3$ in FIG. 5 quite obviously correspond to those in FIG. 2 and increase gradually, one after another, as the heating cycles goes on. The reason for this has already been explained in the foregoing. On the other hand, an inlet temperature b is kept substantially constant irrespective of the proceeding of heating cycles. For this reason, difference between the inlet temperature and the outlet temperature at the commencement of heating increases as the cycle proceeds, with the result that difference between the inlet temperature and the outlet temperature at the termination of heating for each cycle (the time point of termination of the heating was defined as the time point when water began to boil, and the period from the commence to termination of the heating took 2 minutes and 35 seconds) increases gradually as shown by $\Delta T_1$, $\Delta T_2$ and $\Delta T_3$ in FIG. 5. If a preset is so fixed that the heating operation is stopped when difference between the inlet temperature and the outlet temperature reaches a predetermined value, for example $\Delta T_1$, the second cycle becomes immature and in advance of the third cycle, the heating operation is stopped, thereby preventing the third cycle.

Obviously, the disadvantage of FIG. 3 holds true for the second arrangement.

The disadvantages of the second arrangement of FIG. 4 includes not only the above-mentioned disadvantage but also such a disadvantage due to the provision of the inlet temperature sensor in addition to the outlet temperature sensor as aforementioned.

Figure 6:
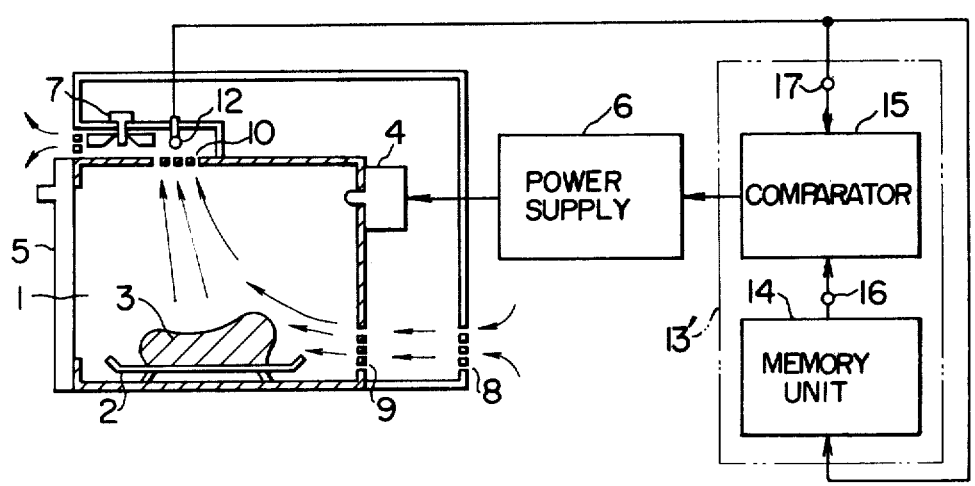
FIG. 6 is a schematic diagram of a high frequency energy apparatus with a heating control arrangement embodying the invention.

The invention will now be described by way of an embodiment with reference to FIG. 6 in which a high frequency energy apparatus with a heating control arrangement is illustrated, of which the same component elements as those of FIGS. 1 and 4 are designated by the same reference numerals. The apparatus schematically shown in FIG. 6 comprises a memory unit 14 and a comparator 15 which constitute a control unit 13'. The comparator 15 has two input terminals 16 and 17. In operation, the temperature of outlet air drawn out of the heating chamber immediately before or after the commencement of heating operation at each cycle, that is, an initial value of the outlet temperature, is sensed by the outlet temperature sensor 12 and a sensed signal is memorized in the memory unit 14. The memory unit 14 delivers the memorized initial value to the first input terminal 16 of the comparator 15 throughout the heating period.

Then, the object 3 is heated, an outlet temperature which rises in accordance with the lapse of time owing to heat generated from the object 3 is sensed by the outlet temperature sensor 12 and a signal sensed thereby is supplied to the second input terminal 17 of the comparator 15. This comparator 15 successively compares the memorized initial value of outlet temperature with the outlet temperature being sensed during heating operation and when a resulting temperature difference reaches a preset value, the power supply 6 is turned off to cause the high frequency oscillator tube 4 to stop oscillating.

Figure 7:
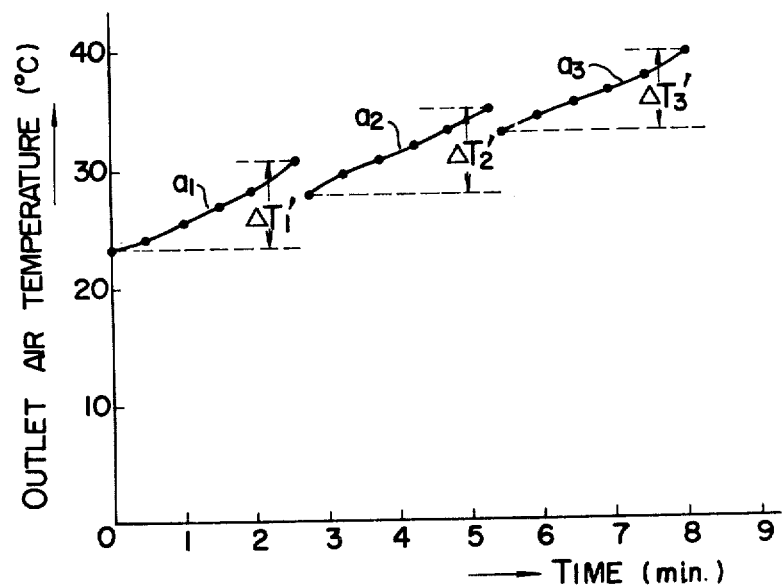
FIG. 7 is a graph for explaining effects of the embodiment of FIG. 6.

As will be seen from the above, it is possible to accurately sense the outlet temperature rise without fail by memorizing the initial value of outlet temperature and comparing the initial value with the outlet temperature being sensed during heating operation.

Where the continuous operation of the high frequency energy apparatus is repeated cyclically, the outlet temperature at the commencement of heating increases gradually as the cycle proceeds. Therefore, it was inevitable to cause a great controlling error as explained with reference to FIGS. 2 and 5 with the first prior art arrangement of FIG. 1 wherein only the outlet temperature is compared with the fixed reference value to stop the heating when that outlet temperature reaches the reference value and with the second prior art arrangement wherein the difference between outlet temperature and inlet temperature is compared with a reference value to stop the heating when that difference reaches the reference value. In contrast, according to the invention, outlet temperature rises $\Delta T_1'$, $\Delta T_2'$ and $\Delta T_3'$ relative to the initial values of outlet temperature for heating cycles are sensed as shown in FIG. 7 (in which outlet temperature curves $a_1$, $a_2$ and $a_3$ for heating cycles are depicted) and the heating operation is controlled by comparing these outlet temperature rises $\Delta T_1'$, $\Delta T_2'$ and $\Delta T_3'$ with the memorized reference values, so that it is possible to greatly reduce the controlling error during the continuous, cyclic operation of the apparatus. There is no need to further describe superiority of the foregoing embodiment of this invention to the first prior art arrangement of FIG. 1. This holds true for the comparison with the second prior art arrangement. A comparative experiment was made on the outlet temperature rise between the foregoing embodiment of the invention and the prior art arrangement of FIG. 4 by heating, for example, 200 cc water of an initial temperature of 20° C. up to the boiling temperature. Results are shown in Table 1. It will be clearly understood from Table 1 that variation in the outlet temperature rise for each cycle of the continuous operation is considerably small, thereby improving accuracy of controlling.

Table 1

|  | Outlet temperature rise (°C.) | | |
| --- | --- | --- | --- |
|  | 1st cycle | 2nd cycle | 3rd cycle |
| Prior art (Fig. 5) | $\Delta T_1 = 7.2$ | $\Delta T_2 = 11.4$ | $\Delta T_3 = 16.0$ |
| The invention (FIG. 7) | $\Delta T_1' = 7.2$ | $\Delta T_2' = 7.1$ | $\Delta T_3' = 6.6$ |

Further, according to the foregoing embodiment, since the initial value of outlet temperature is used as reference value for comparison, the adverse affect by the inlet temperature upon the controlling accuracy, such as for example the affect by difference between the inlet temperature and the outlet temperature at the commencement of heating as observed in the prior art arrangement of FIG. 4, can be eliminated. Theoretically, the embodiment needs no inlet temperature sensor such as sensor 11 and hence also eliminates a disadvantage which would be caused from irregularity of physical characteristics of the inlet temperature sensor 11.

It is general, in the foregoing embodiment, to use a thermistor or a thermocouple as the outlet temperature sensor 12 and to convert a signal representative of the outlet temperature sensed by the sensor into a voltage which in turn is subjected to a signal processing. The memory unit 14 may take the form of an analog memory such as a capacitor memory or a digital memory.

Figure 8:
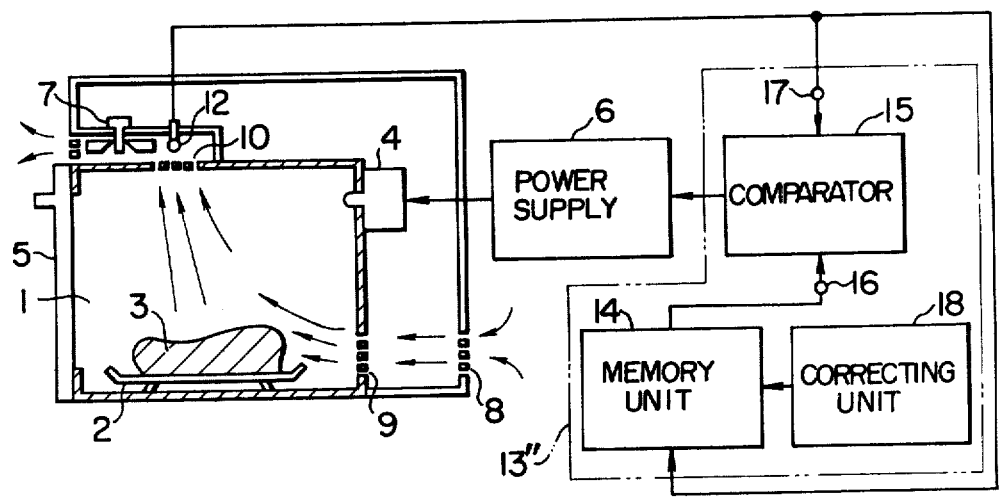
FIG. 8 is a schematic diagram of another embodiment of high frequency energy apparatus according to the invention.
Figure 9:
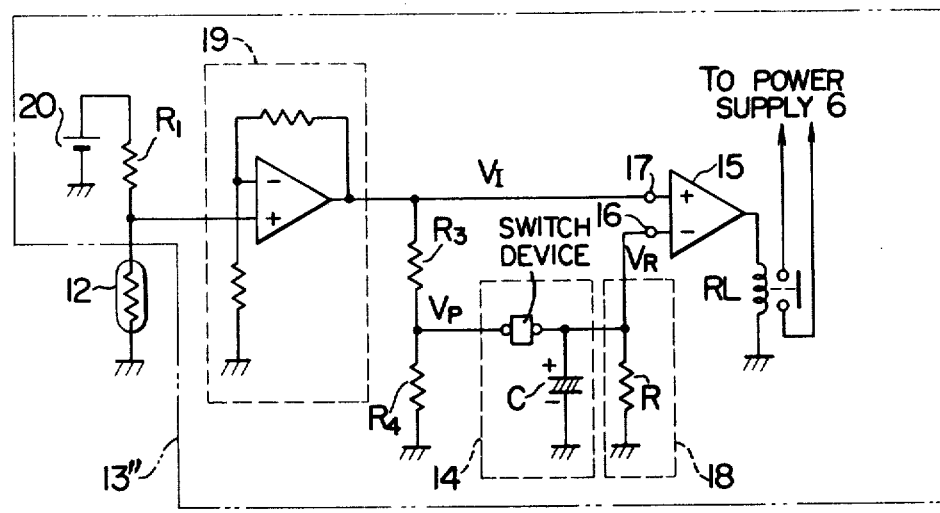
FIG. 9 is a circuit diagram of one embodiment of heating control arrangement incorporated in the embodiments of FIGS. 6 and 8.

Another embodiment of the invention will now be described with reference to FIG. 8 in which the same component elements as those of FIG. 6 embodiment are designated by the same reference numerals. An arrangement shown in FIG. 8 further comprises a correcting unit 18. The memory unit 14 memorizes the initial value of the sensed outlet temperature as a reference value for the comparison with the outlet temperature being sensed during heating and the correcting circuit 18 functions to vary the memorized reference value with the lapse of time, so that the setting value for the outlet temperature rise used for stopping heating is also gradually varied with the heating time, thereby eliminating the controlling error which depends on the mass of the object to be heated as explained with reference to FIG. 3. FIG. 9 shows a specific construction of a control unit 13″ incorporated into this embodiment. In FIG. 9, the same component elements as those in FIG. 8 are designated by the same reference numerals. The control unit 13″ as illustrated in the form of a circuit arrangement in FIG. 9 comprises an outlet temperature sensor 12 of a thermistor, a non-inverting operational amplifier 19 (hereinafter simply referred to as amplifier), a memory unit 14 using a capacitor C, a correcting circuit of a resistor R as designated at reference numeral 18 in FIG. 8 adapted to correct the controlling error dependent on the mass of the object to be heated, and a comparator 15. If the resistor R is removed, this control unit construction may be applied to the control unit 13′ of FIG. 6.

Figure 10:
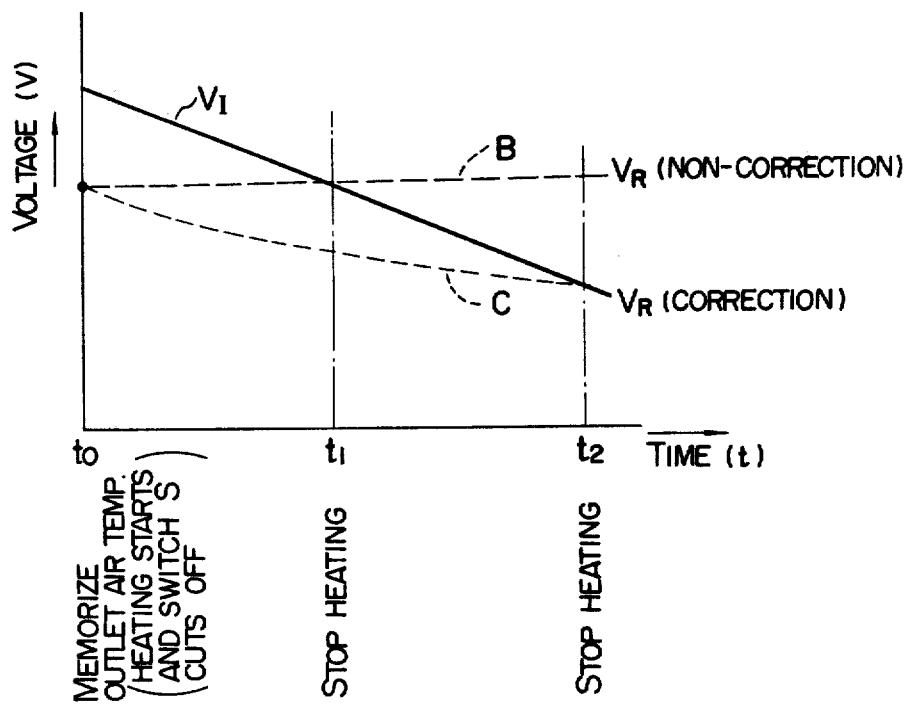
FIG. 10 is a graph for explaining effects of the apparatus shown in FIGS. 8 and 9.

For simplification of description, an explanation will first be given of a construction removed of the resistor R with reference to FIGS. 6, 9 and 10. In FIG. 9, a resistor $R_1$ and the outlet temperature sensor 12 divide a voltage of a DC power supply 20 and a signal corresponding to a sensed outlet temperature is supplied to one input of the amplifier 19. An output voltage $V_I$ from the amplifier 19 which corresponds to the sensed outlet temperature is applied to the second input terminal 17 of the comparator 15. The output voltage $V_I$, on the other hand, is divided by resistors $R_3$ and $R_4$ and applied to the memory unit 14 which includes a switch device S and the capacitor C. Since the switch device S is closed immediately before the commencement of heating operation, a terminal voltage $V_p$ across the resistor $R_4$ corresponding to a division of the sensed outlet temperature voltage $V_I$ by resistors $R_3$ and $R_4$ charges the capacitor C. Thereafter, the heating starts at time $t_o$ and switch device S opens. At this time, a charging voltage across the capacitor C has reached a voltage $V_R$ which corresponds to an initial value of the sensed outlet temperature. The voltage $V_R$ has been memorized in the capacitor C and it is kept substantially constant in the case where the correcting resistor R (See dashed line B in FIG. 10) is removed. This memorized voltage $V_R$ is applied as a reference voltage to the first input terminal 16 of the comparator 15.

The comparator 15 compares the sensed outlet temperature voltage $V_I$ with the reference voltage $V_R$ corresponding to the initial value of outlet temperature to produce an output which in turn is applied to an exciting coil of a relay RL. The relay RL has a contact connected to the power supply 6 feeding the high frequency oscillator tube 4 and when the contact is opened the output of power supply 6 is turned off to cause the high frequency oscillator tube 4 to stop oscillating. Before the heating starts, $V_I > V_R$ is held by means of a voltage drop across the resistor $R_3$ to sustain the output voltage of comparator 15 at a high level so that a current is passed through the exciting coil of relay RL to close the contact, thereby enabling the high frequency oscillator tube 4 to oscillate. Thereafter, when the heating starts, the temperature of air flowing out of the heating chamber 1 rises and the resistance of the thermistor used as the outlet temperature sensor 12 decreases gradually. In response thereto, the input voltage to the amplifier 19 decreases and the sensed outlet temperature voltage $V_I$ amplified by amplifier 19 also decreases gradually. Eventually, at the time point $t_1$ at which the outlet temperature has risen a predetermined value with respect to the initial value obtained prior to heating, $V_I < V_R$ stands. Consequently, the output voltage of the comparator 15 is inverted from a high level to a low level to reduce the current flowing through the coil of the relay RL, so that the contact is opened to cause the high frequency oscillator tube 4 to stop oscillating.

In accordance with the operation described above, the memorized initial value of outlet temperature is successively compared with the outlet temperature being sensed during heating to determine the time at which the resulting temperature reference reaches the set value, thereby controlling the heating operation by means of the outlet temperature rise.

Incidentally, if the set value of outlet temperature rise for causing the high frequency oscillator tube to stop oscillating is maintained constant, a great error in the finished temperature is caused depending on the mass of the object to be heated as shown in FIG. 3.

Thus, the arrangement shown in FIGS. 8 and 9 is provided with the correcting unit. The signal corresponding to the initial value of the sensed outlet temperature which is memorized in the memory unit 14 is used as the reference value for the comparison with the outlet temperature being sensed during heating operation and the memorized reference value $V_R$ is varied with time by the correcting unit 18 of FIG. 8 exemplified as the resistor R in FIG. 9, so that the set value of outlet temperature rise used for stopping the heating operation is gradually increased with the heating time, thereby correcting an error in heating control due to variations in mass of the object to be heated.

Figure 11:
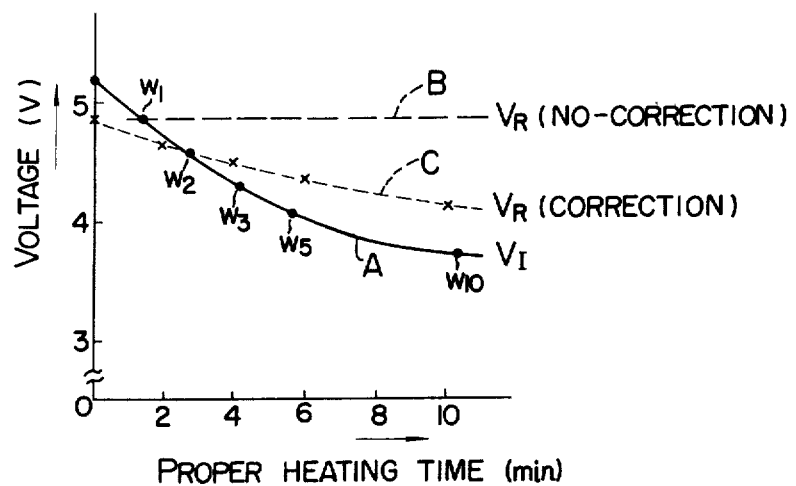
FIG. 11 is a graph for explaining effects of the apparatus shown in FIGS. 8 and 9.

An operational principle of such a correcting unit will now be described with reference to FIG. 11. As shown in FIG. 11 with water used as the object to be heated, the reference voltage $V_R$ applied to the first input terminal 16 of the comparator 15 and the sensed outlet temperature voltage $V_I$ applied to the second input terminal 17 of the comparator 15 are plotted with respect to proper heating time. The proper heating time herein represents time required for different mass of water of 20° C. initial temperature to boil.

In FIG. 11, points $w_1$, $w_2$, $w_3$, $w_5$ and $w_{10}$ indicate the measured time points, at which 100 cc, 200 cc, 300 cc, 500 cc and 1000 cc water have been heated to be boiled and the corresponding sensed outlet temperature voltages $V_I$, respectively. Solid curve A tracing these points $w_1$, $w_2$, $w_3$ ... $w_{10}$ represents variation of the sensed outlet temperature voltage $V_I$. As will be understood from the foregoing description, the sensed outlet temperature voltage $V_I$ corresponds to the outlet temperature rise. Therefore, the solid curve A teaches such a principle that the setting value representative of the proper outlet temperature rise should be varied in dependence on the mass of object in order to obtain a proper heating for the individual object to be heated. To refer to FIG. 11 more specifically, take a case where 100 cc water is desired to be heated up to the boiling temperature, for example. It will be seen from the graph of FIG. 11 that by setting the reference voltage $V_R$ to 4.9 volts in order that the heating is stopped when $V_I$ starting from 5.2 volts falls to 4.9 volts, a heating time of 1 minute and 20 seconds brings the object to the desirable finished temperature or boiling temperature. Similarly, where 500 cc water is desired to be heated up to the boiling temperature, a sensed outlet temperature voltage $V_I$ of 4.1 volts is required for stopping the heating and by setting the reference voltage $V_R$ to 4.1 volts, the heating can be stopped just when the temperature of water reaches the boiling temperature, taking 5 minutes and 36 seconds.

As described above, for a larger mass of water, the proper heating time is prolonged and the variation of sensed outlet temperature voltage $V_I$ is widened. Therefore, it is possible to reduce variations in finished temperature due to the mass of water by increasing the set value of outlet temperature rise required for stopping the heating in accordance with increased mass of water, that is, by varying the reference voltage $V_R$ with time in accordance with the variation of $V_I$ shown at solid curve A in FIG. 11. As will be easily understood, it is ideal that the reference voltage $V_R$ should be varied along the curve A. In this sense, the curve A can be an ideal correcting curve for the reference voltage $V_R$. To explain this in more detail, reference is made to FIG. 10. In FIG. 10, at the time point $t_0$ at which the heating operation starts, $V_I > V_R$ also stands and hence the relay RL is energized to cause the high frequency oscillator tube 4 to oscillate. As the heating proceeds, $V_I$ decreases and $V_R$ also decreases (illustrated at dotted curve C). Since a decreasing rate of $V_I$ is greater than that of $V_R$, $V_I < V_R$ stands at the time point $t_2$ at which the proper heating temperature is obtained, deenergizing the relay RL.

The reference voltage $V_R$ can easily be corrected by utilizing charging characteristic or discharging characteristic of a capacitor. An example is illustrated in FIG. 9. Thus, in order to use decrease in terminal voltage across the capacitor C through discharging, the resistor R is added to constitute a discharging circuit for the capacitor C, through which discharging circuit the capacitor C is intentionally discharged. As having been described, the switch device S is opened when the heating starts and the electric charge so far stored in the capacitor C is gradually discharged through the resistor R so that the terminal voltage across the capacitor C, that is, the reference voltage $V_R$ attenuates with time. By selecting a suitable discharging time constant, an approximative correcting curve for the reference voltage $V_R$ can be obtained. Dashed line B shown in FIG. 11 corresponds to the reference voltage $V_R$ when the correction is not provided, and the dashed line B is invariable with time. Dotted curve C, on the other hand, corresponds to the reference voltage $V_R$ when an approximate correction is provided by means of the correcting unit of FIG. 9. Approximation of the correction curve C to the ideal curve (solid curve A representative of variation of $V_I$ or curves resulting from substantial, parallel displacement of the solid curve A) is rather poor but, as a result of an experiment, it was proved that a deviation from a target finished temperature of 100° C. for 300 cc to 1000 cc water was decreased to 8° C. when the correction was made (23° C. when the correction was not made), offering a remarkable effect. Of course, it is expected that the deviation of the finished temperature due to the mass of water will be made negligible for the practical purpose by promoting the approximation for the correcting curve.

It should be noted that the embodiment of FIG. 9 achieves drastic effects beyond its simple construction. A single capacitor of the embodied construction serves as not only a memory capacitor of the memory unit 14 for coping with the variation due to the continuous operation of the high frequency energy apparatus but also a correcting capacitor for guarding against the variation due to the mass of the object to be heated on the basis of its discharging phenomenon. The switch device S, capacitor C and resistor R are sufficient to constitute the memory unit 14 and correcting circuit 18, and the addition of the correcting circuit is not expensive.

Generally, a capacitor memory has difficulties with the attenuation of memorized information due to discharging of the capacitor and especially, a serious problem arises if a long time memory function is needed. The invention, however, rather takes advantage of the above defect of the capacitor memory and intentionally makes use of the capacitor discharging. As a result, the memory unit 14 can be materialized with an inexpensive capacitor memory. At the same time, the capacitor C can be of a small capacitance, thereby lowering the manufacturing cost. Also, it should be understood that the switch device S has been described in the foregoing description as being turned off at the time point $t_0$ at which the heating operation starts but the switch device S may be arranged to be turned off immediately before the commencement of the heating operation or after a given time has elapsed from the time point $t_0$.

Figure 12:
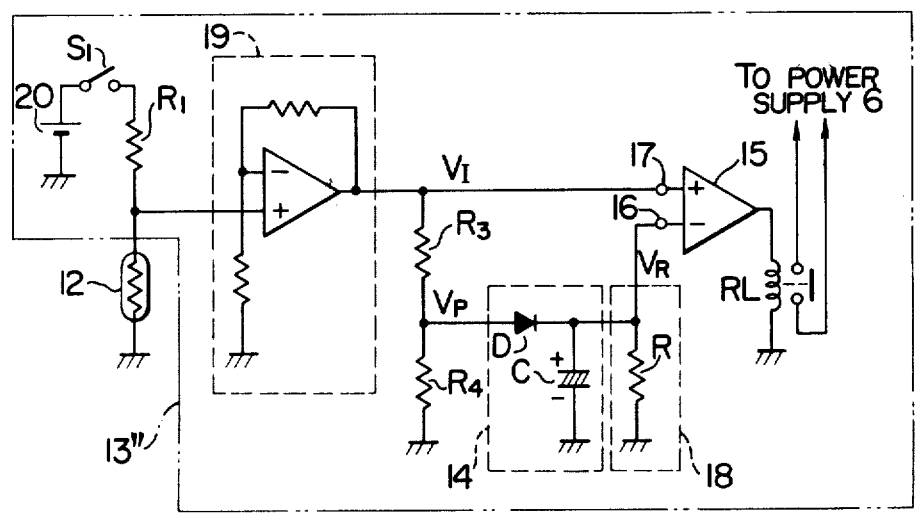
FIG. 12 is a circuit diagram of a modification of FIG. 9.

Turning to FIG 12, a modification of FIG. 9 will be described. In FIG. 12, the same component elements as those of FIG. 9 are designated by the same reference numerals. Differing from the embodiment of FIG. 9 wherein the switch S is provided for the memory unit 14, the modification shown in FIG. 12 comprises a diode D in place of the switch S and in addition, a switch $S_1$ for switching the DC power supply 20. In FIG. 9, the switch device S specifically comprises a switch element such as a conventional relay and a switch element drive circuit with a timer for setting the timing for memory. Thus, after the relay is energized to close the switch device S and thereafter the set timing reaches, the relay is deenergized automatically to turn off the switch device S. The diode D of FIG. 12 plays the role of the switch device S of FIG. 9. More particularly, in the modified embodiment shown in FIG. 12, the voltage corresponding to the outlet temperature at the commencement of heating is fed to the capacitor C through the diode D but the diode current decreases depending on the degree of charging the capacitor C and/or the outlet temperature rise, so that the diode D is rendered cut off and at this time the initial value of the sensed outlet temperature has been memorized in the capacitor C.

Figure 13:
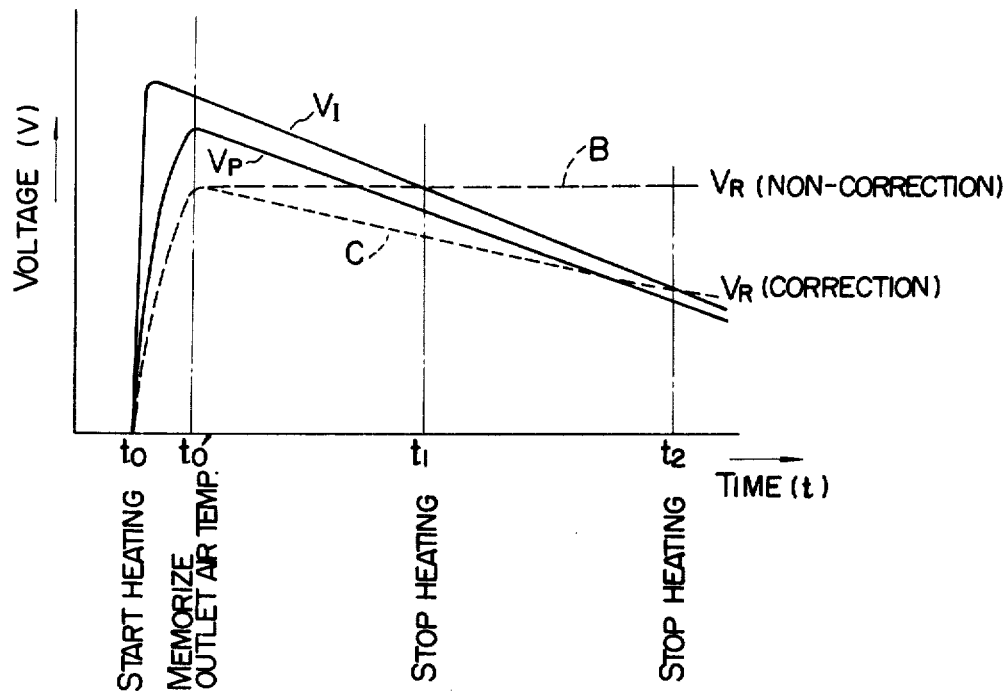
FIG. 13 is a graph for explaining operation and effects of the modification shown in FIG. 12.

An operational description will first be given of the modified embodiment under the situation that the correcting resistor R is removed. In operation, when the heating starts, the switch $S_1$ is closed to feed a voltage of the DC power supply to the heating control circuit. A sensed outlet temperature voltage $V_I$ is divided by the resistors $R_3$ and $R_4$ to form a division voltage $V_p$ which in turn charges the capacitor C through the diode D. A charging voltage $V_R$ of the capacitor C stands for the reference voltage for the comparator 15. FIG. 13 shows relations between the voltages $V_I$, $V_P$ and $V_R$, corresponding to FIG. 10.

As shown in FIG. 13, until the charging voltage $V_R$ of capacitor C saturates or reaches a maximum value following the commencement of heating at the time point $t_o$ and closure of switch $S_1$, the charging current through the diode D is alive and hence the voltage $V_R$ increases along with the increasing voltage $V_P$. As the charging of capacitor C proceeds, the charging current flowing through the diode D decreases accordingly. Assuming now that the time constant for charging the capacitor C (approximately, a function of the resistor $R_3$ and the capacitor C) is sufficiently small, at the time when the charging voltage $V_R$ of capacitor C reaches the maximum value to complete the charging, the charging current flowing through the diode D falls to zero to thereby cut it off. On the other hand, the voltage $V_I$ decreases gradually in accordance with the outlet temperature rises, as shown in FIG. 13. Accordingly, the voltage $V_P$ decreases along with the decreasing $V_I$ following reaching a maximum value and if the time constant for charging the capacitor C is large, the difference between $V_P$ and $V_R$ (that is, a voltage across the diode D) decreases gradually to render the diode D cut off ultimately. In this manner, the diode D is brought into a cut-off state depending on the degree of charging of the capacitor C and/or the outlet temperature rise.

In the case where the correcting resistor R is omitted, the voltage $V_R$ remains substantially constant after reaching the maximum value (See dashed curve B in FIG. 13). Consequently, an outlet temperature at the time point $t_o'$ at which the voltage $V_R$ reaches the maximum value was memorized in the capacitor C. Since the charging time constant for the capacitor C is selected so small that the memorizing time $t_o'$ is set immediately after the heat starting time point $t_o$, it is possible to memorize the voltage $V_R$ corresponding to the initial value of outlet temperature in the capacitor C. The voltage $V_R$ thus memorized is applied as the reference voltage to the first input terminal 16 of the comparator 15, as explained in connection with the foregoing embodiment. As the heating proceeds, $V_I < V_R$ stands at the time point $t_1$ in a quite similar manner to the embodiment of FIG. 9, thereby stopping the heating.

The heating control operation has been described just above by referring to FIG. 12 under the condition that the correcting resistor R is omitted. When the correcting resistor R is provided, the correction for the variation due to the mass of the object to be heated can be attained in the same manner as described referring to the embodiment of FIG. 9. More particularly, a corrected reference voltage $V_R$ designated at the dotted curve C in FIG. 13 still remains at the time point $t_2$ in a state $V_I > V_R$ so that it is not before the time point $t_2$ that $V_I < V_R$ stands to stop the heating. The correction by the resistor R will not be detailed any more.

According to this modified embodiment, by using a capacitor as a memory element for memorizing the initial value of the sensed outlet temperature and a diode as a sampling switch, there is no need for providing a switch drive circuit with a timer for setting memory timing, and the memory unit can be constituted with the single diode and the single capacitor. For these reasons, the heating control arrangement according to this modification can be simplified, thus bringing about low cost, low power consumption and miniaturization.

Figure 14:
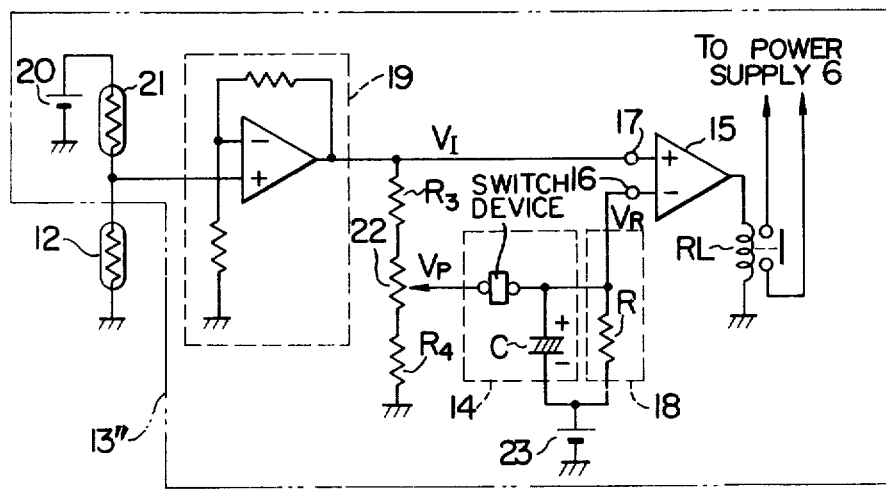
FIG. 14 is a circuit diagram of another embodiment of heating control arrangement incorporated in the embodiments of FIGS. 6 and 8.

FIG. 14 shows another modified embodiment of heating control arrangement of the invention. In FIG. 14, the same component elements as those in FIGS. 9 and 12 are designated by the same reference numerals and characters. This modification is different from the embodiment of FIG. 9 in that a thermistor 21 is provided in place of the resistor $R_1$ of FIG. 9, that a variable resistor 22 is interposed between the resistors $R_3$ and $R_4$, and that a DC power supply 23 is connected between ground and the parallel circuit consisting of the capacitor C and the resistor R. This modification has the following three features:

(1) Variations in the ambient temperature surrounding the high frequency energy apparatus result in variations in the outlet temperature prior to the commencement of heating operation. For this reason, the resistance of the thermistor 12 serving as outlet temperature sensor in the embodiment of FIG. 9 varies depending on the ambient temperature, thereby causing the input and output voltages of the amplifier 19 to vary. It is necessary to sufficiently widen the normal operating range of the amplifier 19 which operates as a linear amplifier since otherwise the operating point varies with the ambient temperature and the amplifier would operate abnormally in the cut-off range or saturation range. This requires a high power supply voltage for the amplifier 19, resulting in an increased power consumption and high cost for circuit elements. Further, the charging voltage $V_R$ of the capacitor is varied with the ambient temperature with the result that the terminal voltage across the capacitor, that is, the reference voltage $V_R$ decreases through the capacitor discharging at different gradient of the attenuation characteristics. Consequently, the set value for the outlet temperature rise used for stopping the heating operation is varied with the ambient temperature, resulting in an erroneous controlling (the lower the ambient temperature is, the higher the initial value of reference voltage $V_R$ becomes. Accordingly, the set value for the outlet temperature rise is increased).

FIG. 14 gives a countermeasure for this problem wherein a thermistor is used as ambient temperature compensating temperature sensor 21 and the voltage of DC power supply 20 is divided by the temperature sensor 21 and the outlet temperature sensor 12. This ambient temperature compensating temperature sensor 21 may be located on an inlet air passage to the heating chamber or in the proximity of a ventilation opening (not shown) bored in the console of the high frequency energy apparatus and senses the ambient temperature. The ambient temperature compensating temperature sensor 21 and the outlet temperature sensor 21 will sense the same variation in ambient temperature so that, if paired thermistors having the same characteristics are used as the two temperature sensors, the input voltage to the amplifier 19 of FIG. 14 is kept substantially constant irrespective of the ambient temperature prior to the commencement of heating operation. Thereafter, as the heating proceeds, the sensed temperature of the outlet temperature sensor 12 increases gradually in accordance with the outlet temperature rise whereas the sensed temperature of the ambient temperature compensating temperature sensor 21 remains substantially unchanged during the heating period. Accordingly, variations in the operating point of amplifier 19 due to variations in the ambient temperature and resultant variations in the set value for the outlet temperature rise can be compensated for.

Although, in this embodiment, the outlet temperature sensor 12 and ambient temperature compensating temperature sensor 21 were materialized by thermistors, they may be temperature sensitive semiconductors other than thermistors.

(2) The proper heating temperature slightly differs depending on the type of the object to be heated. Also, there exists a temperature of foodstuffs favorite to a faste of persons. For these reasons, it is desirable that the finished temperature of the object is adjustable. As exemplified in FIG. 14, the finished temperature of the object can be adjusted by making variable the set value for the outlet temperature rise used for stopping the heating operation. In FIG. 14, the voltage corresponding to the initial value of the sensed outlet temperature is memorized in the capacitor C and this memorized voltage is used as a reference voltage $V_R$ fed to the comparator 15. Accordingly, if the voltage $V_P$ supplied to the capacitor is varied by means of the temperature adjusting variable resistor 22, the reference voltage $V_R$ is varied and then the difference between the sensed outlet temperature voltage $V_I$ at the commencement of heating and the reference voltage $V_R$ is also varied. In this manner, it is possible to adjust the set value for the outlet temperature rise.

Figure 15:
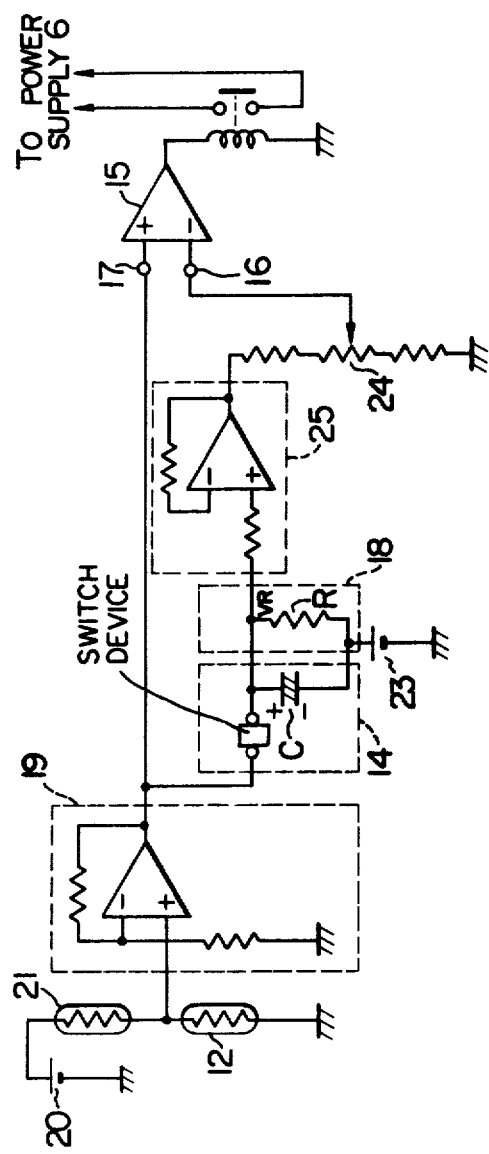
FIG. 15 is a circuit diagram of still another embodiment of heating control arrangement incorporated in the embodiments of FIGS. 6 and 8.

In FIG. 14, the charging voltage $V_P$ for the capacitor C was adjusted by the variable resistor 22 provided in advance of the switch device S. Alternatively, as shown in FIG. 15, the reference voltage $V_R$ may be adjusted by a variable resistor 24. In the modification shown in FIG. 15, however, the provision of a unity gain buffer 25, for example, is necessary for preventing variations in discharging characteristics of capacitor C due to the addition of the adjusting circuit.

(3) Repeated continuous heating raises the initial value of the sensed outlet temperature to a great extent and in extremity, the outlet temperature rise saturates. In the event of saturation, the outlet temperature rise characteristics are so flattened that the outlet temperature rise cannot reach the set value required for stopping the heating operation. If the heating continues under this condition, a seriously dangerous state will occur in which the object to be heated is smoked and burnt out.

The modification shown in FIG. 14 gives a countermeasure for preventing such a serious danger. More particularly, this modified embodiment comprises a DC power supply 23 connected between ground and the parallel circuit consisting of the memory capacitor C and the resistor R. The DC power supply 23 prevents the reference voltage $V_R$ from being lowered below its voltage, thus providing a lower limit of the attenuation of the reference voltage $V_R$. Conversely, the outlet temperature (not outlet temperature rise) is given with an upper limit so that the danger due to overheating can be prevented. This additional DC power supply 23 also decelerates the attenuation of reference voltage $V_R$ and hence enlarges the apparent discharging time constant.

As has been described, according to the invention, the initial value of the sensed outlet temperature is memorized and the memorized initial value is compared with the outlet temperature being sensed during the heating operation to constantly, accurately determine the outlet temperature rise which in turn is used to control heating operation, thereby greatly reducing controlling errors due to variations in the initial outlet temperature which are caused when the high frequency energy apparatus is operated continuously and cyclically. Further, in proportion to the prolongation of heating time, the set value for the outlet temperature rise used for stopping the oscillation of high frequency oscillator tube is increased, thereby correcting controlling errors due to variations in the mass of the object to be heated. Accordingly, accuracy of sensing the object temperature can be improved as compared with prior art heating control, giving rise to great reduction in deviation from the finished temperature and a proper automatically controlled heating.

While, in the foregoing various embodiments, the temperature of air flowing out of the heating chamber is sensed, the invention may be applicable to a case wherein the temperature of air within the heating chamber is sensed. In this case, it is necessary to shield the temperature sensor from the high frequency energy by means of an electromagnetic wave shield.

The ventilating fan 7 for forcibly ventilating the air within the heating chamber is used in the foregoing embodiments but the air may be circulated based on the natural convection without using the ventilating fan, without impairing the effects of the invention.

Further, in the foregoing embodiments, the high frequency oscillator tube is caused to stop oscillating when the outlet temperature rise reaches the preset value but the invention may be embodied such that the amount of high frequency energy is decreased or increased without stopping the oscillation of the high frequency oscillator tube when the outlet temperature rise reaches the preset value.

What is claimed is:

1. A high frequency energy apparatus for heating an object to be heated by using high frequency energy comprising:
    a heating chamber in which the object is placed to be heated;
    means for generating high frequency energy;
    means for supplying the high frequency energy generated by said high frequency energy generating means to said heating chamber;
    first temperature sensing means for sensing the temperature of selected one of air within said heating chamber and air flowing out of said heating chamber;
    means for memorizing a temperature sensed by said first temperature sensing means at a predetermined time point;
    comparing means for comparing a temperature being sensed by said first temperature sensing means with the value memorized in said memory means; and means for controlling the supply of high frequency energy from said high frequency energy generating means in accordance with an output signal from said comparing means.

2. The high frequency energy apparatus according to claim 1, further comprising means for correcting heating time by varying the value memorized in said memory means with the lapse of the heating time so as to obtain proper heating time.

3. The high frequency energy apparatus according to claim 2, wherein said first temperature sensing means comprises means for delivering an electrical signal of a voltage which varies in accordance with a rise of the temperature being sensed, wherein said memory means comprises a capacitor, and means for supplying said electrical signal to said capacitor for a predetermined period, wherein said correcting means comprises discharge means for discharging a charge of said capacitor at a predetermined discharging time constant, and wherein said comparing means comprises a comparator having a first input fed with said electrical signal and a second input fed with the charged voltage of said capacitor and comparing the two inputs to produce said output signal when the difference between the two inputs reaches a predetermined value.

4. The high frequency energy apparatus according to claim 3, wherein said controlling means comprises electromagnetic relay means actuatable by said output signal produced from said comparator to control the supply of said high frequency energy.

5. The high frequency energy apparatus according to claim 3, wherein said first temperature sensing means comprises a thermistor.

6. The high frequency energy apparatus according to claim 5, further comprising a second thermistor disposed at a portion outside said heating chamber, said second thermistor being connected with said first thermistor in series to compensate variations in said electrical signal due to variations in temperature of air flowing into said heating chamber.

7. The high frequency energy apparatus according to claim 3, wherein said means for supplying said electrical signal to said capacitor comprises a timed switch means which supplies said electrical signal to said capacitor when energized and interrupts this supply a predetermined time after the energization.

8. The high frequency energy apparatus according to claim 3, further comprising second temperature sensing means disposed at a portion outside said heating chamber, said second temperature sensing means being associated with said first temperature sensing means to compensate variations in said electrical signal due to variations in temperature of air flowing into said heating chamber.

9. The high frequency energy apparatus according to claim 3, wherein said discharge means comprises a resistor of a predetermined resistance connected in parallel with said capacitor.

10. The high frequency energy apparatus according to claim 3, further comprising means for applying a DC bias voltage to said second input of said comparator to prevent the input voltage at said second input from being lowered below a predetermined value even when said charged voltage of said capacitor discharges through said discharge means.

11. The high frequency energy apparatus according to claim 2, wherein said first temperature sensing means comprises means for delivering an electrical signal of a voltage which varies in accordance with a rise of the temperature being sensed, wherein said memory means comprises voltage divider means for dividing the voltage of said electrical signal to deliver a division voltage which is reduced at a predetermined ratio from the voltage of said electrical signal, a capacitor and means for supplying said reduced voltage produced from said voltage divider means to said capacitor for a predetermined period, wherein said correcting means comprises discharge means for discharging a charge of said capacitor at a predetermined discharging time constant, and wherein said comparing means comprises a comparator having a first input fed with said electrical signal and a second input fed with the charged voltage of said capacitor and comparing the two inputs to produce said output signal when the difference between the two inputs reaches a predetermined value.

12. The high frequency energy apparatus according to claim 11, wherein said voltage divider means comprises a variable resistor for varying said ratio of said division voltage.

13. The high frequency energy apparatus according to claim 2, wherein said first temperature sensing means comprises means for delivering an electrical signal of a voltage which varies in accordance with a rise of the temperature being sensed, wherein said memory means comprises a capacitor, means for supplying said electrical signal to said capacitor for a predetermined period, and voltage divider means for dividing the charged voltage of said capacitor to deliver a division voltage which is reduced at a predetermined ratio from the charged voltage of said capacitor, wherein said correcting means comprises discharge means for discharging a charge of the capacitor at a predetermined dischargeing time constant, and wherein said comparing means comprises a comparator having a first input fed with said electrical signal and a second input fed with said reduced voltage produced from said voltage divider means and comparing the two inputs to produce said output signal when the difference between the two inputs reaches a predetermined value.

14. The high frequency energy apparatus according to claim 13, wherein said voltage divider means comprises a variable resistor for varying said ratio of said division voltage.

15. The high frequency energy apparatus according to claim 1, wherein said first temperature sensing means comprises a first thermistor.

16. The high frequency energy apparatus according to claim 1, wherein said first temperature sensing means comprises means for delivering an electrical signal of a voltage which varies in accordance with a rise of the temperature being sensed, wherein said memory means comprises a capacitor and means for supplying said electrical signal to said capacitor for a predetermined period, and wherein said comparing means comprises a comparator having a first input fed with said electrical signal and a second input fed with a charged voltage of said capacitor and comparing the two inputs to produce said output signal when the difference between the two inputs reaches a predetermined value.

17. The high frequency energy apparatus according to claim 16, wherein said controlling means comprises electromagnetic relay means actuatable by said output signal produced from said comparator to control the supply of said high frequency energy.

18. The high frequency energy apparatus according to claim 16, wherein said first temperature sensing means comprises a thermistor.

19. The high frequency energy apparatus according to claim 18, further comprising a second thermistor disposed at a portion outside said heating chamber, said second thermistor being connected with said first thermistor in series to compensate variations in said electrical signal due to variations in temperature of air flowing into said heating chamber.

20. The high frequency energy apparatus according to claim 16, wherein said means for supplying said electrical signal to said capacitor comprises timed switch means which supplies said electrical signal to said capacitor when energized and interrupts this supply a predetermined time after the energization.

21. The high frequency energy apparatus according to claim 16, further comprising second temperature sensing means disposed at a position outside said heating chamber, said second temperature sensing means being associated with said first temperature sensing means to compensate variations in said electrical signal due to variations in temperature of air flowing into said heating chamber.

22. The high frequency energy apparatus according to claim 1, wherein said first temperature sensing means comprises means for delivering an electrical signal of a voltage which varies in accordance with a rise of the temperature being sensed, wherein said memory means comprises voltage divider means for dividing the voltage of said electrical signal to deliver a division voltage which is reduced at a predetermined ratio from the voltage of said electrical signal, a capacitor, and means for supplying said reduced voltage produced from said voltage divider means to said capacitor for a predetermined period, and wherein said comparing means comprises a comparator having a first input fed with said electrical signal and a second input fed with a charged voltage of said capacitor and comparing the two inputs to produce said output signal when the difference between the two inputs reaches a predetermined value.

23. The high frequency energy apparatus according to claim 22, wherein said voltage divider means comprises a variable resistor for varying said ratio of said division voltage.

24. The high frequency energy apparatus according to claim 1, wherein said first temperature sensing means comprises means for delivering an electrical signal of a voltage which varies in accordance with a rise of the temperature being sensed, wherein said memory means comprises a capacitor, means for supplying said electrical signal to said capacitor for a predetermined period, and voltage divider means for dividing a charged voltage of said capacitor to deliver a division voltage which is reduced at a predetermined ratio from said charged voltage, and wherein said comparing means comprises a comparator having a first input fed with said electrical signal and a second input fed with said reduced voltage produced from said voltage divider means and comparing the two inputs to produce said output signal when the difference between the two inputs reaches a predetermined value.

25. The high frequency energy apparatus according to claim 24, wherein said voltage divider means comprises a variable resistor for varying said ratio of said division voltage.

* * * * *